(12) United States Patent
Jung et al.

(10) Patent No.: US 8,388,895 B2
(45) Date of Patent: Mar. 5, 2013

(54) APPARATUS FOR PRODUCING $U_3O_8$ POWDER

(75) Inventors: Dong Hyun Jung, Daejon (KR); Seung Jae Lee, Daejon (KR); Joon Ro Lee, Daejon (KR); Beom Jae Lee, Daejon (KR); Kyeong Lak Jeon, Daejon (KR); Jung Min Suh, Seoul (KR); Keun Min Kim, Daejon (KR); Myoung Ho Oh, Daejon (KR); Doo Lae Jeong, Daejon (KR); Nam Kyu Joo, Daejon (KR)

(73) Assignee: KEPCO Nuclear Fuel Co., Ltd., Daejeon (KR)

( * ) Notice: Subject to any disclaimer, the term of this patent is extended or adjusted under 35 U.S.C. 154(b) by 388 days.

(21) Appl. No.: 12/972,471

(22) Filed: Dec. 18, 2010

(65) Prior Publication Data

US 2012/0063964 A1 Mar. 15, 2012

(30) Foreign Application Priority Data

Sep. 9, 2010 (KR) .................. 10-2010-0088445

(51) Int. Cl.
*G21C 1/00* (2006.01)
*B01J 2/00* (2006.01)

(52) U.S. Cl. ......... 422/159; 422/236; 422/237; 422/238
(58) Field of Classification Search ................. 422/159, 422/236, 237, 238
See application file for complete search history.

(56) References Cited

U.S. PATENT DOCUMENTS

| 3,578,419 A | * | 5/1971 | Welty | ................ 423/4 |
| 2002/0005597 A1 | * | 1/2002 | Larson et al. | ................ 264/0.5 |

* cited by examiner

*Primary Examiner* — Walter D Griffin
*Assistant Examiner* — Lessanework Seifu
(74) *Attorney, Agent, or Firm* — Rabin & Berdo, P.C.

(57) ABSTRACT

In an apparatus for producing $U_3O_8$ powder, the apparatus has an oxidation reactor including an interior space, a scrap box loaded with $UO_2$ sintered pellets to be oxidized and introduced into the interior space of the oxidation reactor, an impact generating unit applying an impact to the scrap box to dissipate heat generated by the oxidation of the $UO_2$ sintered pellets in the oxidation reactor, and a control unit controlling an oxidation process. The apparatus for producing $U_3O_8$ powder allows the heat generated by the oxidation of the $UO_2$ sintered pellets in the oxidation reactor to be uniformly dissipated by the impact generating unit, thus producing $U_3O_8$ powder having a larger specific surface area which can be used to obtain a sintered $UO_2$ pellet with a larger and more stable grain size of increased quality.

13 Claims, 4 Drawing Sheets

APPARATUS FOR PRODUCING $U_3O_8$ POWDER

CROSS-REFERENCE TO RELATED APPLICATIONS

The present application claims priority under 35 U.S.C. 119 to Korean Patent Application No. 10-2010-0088445, filed on Sep. 9, 2010, the disclosure of which is expressly incorporated by reference herein in its entirety.

BACKGROUND OF THE INVENTION

1. Technical Field

The present invention relates to an apparatus for producing $U_3O_8$ powder, and, more particularly, to an apparatus for producing $U_3O_8$ powder having a large specific surface area by efficiently discharging the heat occurring when $UO_2$ sintered pellets are oxidized.

2. Description of the Related Art $UO_2$ sintered pellets, which are used as nuclear fuel, are produced by compacting or sintering $UO_2$ powder prepared by a dry process or a wet process. Domestically-used $UO_2$ sintered pellets have been being produced by $UO_2$ powder prepared by a dry conversion process (hereinafter, referred to as "DC process").

Since $UO_2$ sintered pellets can more easily control the release of fission gas occurring during the burning of nuclear fuel in an atomic reactor as their grain size increases, they can increase the rate at which nuclear fuel is burned. The acceptable range of sintered density of $UO_2$ sintered pellets in technical specifications is 94% to 96.5% of theoretical density (TD). In this case, in order to safely use the $UO_2$ sintered pellets in an atomic reactor, the sintered density of the $UO_2$ sintered pellets must be about 95% TD.

Therefore, conventionally, in order to make the sintered density of $UO_2$ sintered pellets fall inside the acceptable range of the technical specifications, 2 wt % to 20 wt % of $U_3O_8$ powder, whose volume per unit weight is about 30% greater than that of $UO_2$ powder, $U_3O_8$ is mixed with $UO_2$ powder to form a mixed powder of $UO_2$ and $U_3O_8$, and then the mixed powder is compression-molded and then sintered at a temperature of 1650° C. to 1800° C. under a hydrogen gas atmosphere to prepare $UO_2$ sintered pellets.

The reason why $U_3O_8$ powder having a large specific surface area is mixed with $UO_2$ powder is that $U_3O_8$ powder, having a large specific surface area, improves the sinterability of $UO_2$ powder, so that $UO_2$ sintered pellets having a large grain size can be easily prepared, and $UO_2$ sintered pellets having high density and a stable porous structure can be obtained.

For this reason, conventionally, defective $UO_2$ sintered pellets or $UO_2$ powder occurring during the preparation of $UO_2$ sintered pellets were compacted to make a slug as a preform, and then the slug was sintered to form $UO_2$ sintered pellets, and then the $UO_2$ sintered pellets were oxidized at a temperature of 300° C. to 400° C. for 10 hours to 24 hours to prepare $U_3O_8$ powder having a large specific surface area.

However, a conventional apparatus for producing $U_3O_8$ powder is designed such that the apparatus is suitable to oxidize an extremely small amount of $UO_2$ sintered pellets (an amount that is small to such a degree that $UO_2$ sintered pellets do not pile up in a conventional scrap box) under laboratory conditions, and is configured such that the apparatus is not provided with an additional device for dissipating the heat generated by the oxidization of $UO_2$ sintered pellets. Therefore, the conventional apparatus for producing $U_3O_8$ powder is not influenced by the heat generated by the oxidization of $UO_2$ sintered pellets when a small amount of $UO_2$ sintered pellets is oxidized, but is problematic in that the heat generated by the oxidization of $UO_2$ sintered pellets increases the temperature around the $UO_2$ sintered pellets to 400° C. or more when the amount of $UO_2$ sintered pellets is increased to about 10 kg or more.

For this reason, the conventional apparatus for producing $U_3O_8$ powder is problematic, in that the higher temperature occurring when a large amount of $UO_2$ sintered pellets is oxidized influences adjacent $UO_2$ powder and $UO_2$ sintered pellets, so that $UO_2$ sintered pellets are oxidized at a temperature (about 400° or more) higher than the desired temperature at which they should be controlled, thereby decreasing the specific surface area of the produced $U_3O_8$ powder.

SUMMARY OF THE INVENTION

Accordingly, the present invention has been devised to solve the above-mentioned problems, and an object of the present invention is to provide an apparatus for producing $U_3O_8$ powder having a specific surface area suitable for preparing $UO_2$ sintered pellets having a large grain size by efficiently discharging the heat occurring during oxidization of the $UO_2$ sintered pellets.

In order to accomplish the above object, one embodiment of the present invention provides an apparatus for producing $U_3O_8$ powder comprising: an oxidation reactor including a space formed therein; a scrap box which is loaded with $UO_2$ sintered pellets to be oxidized and introduced into the oxidation reactor; an impact generating unit applying an impact to the scrap box to dissipate heat generated by the oxidation of the $UO_2$ sintered pellets in the oxidation reactor; and a control unit for controlling an oxidation process.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, preferred embodiments of the present invention will be described in detail with reference to the attached drawings.

Figure 1:
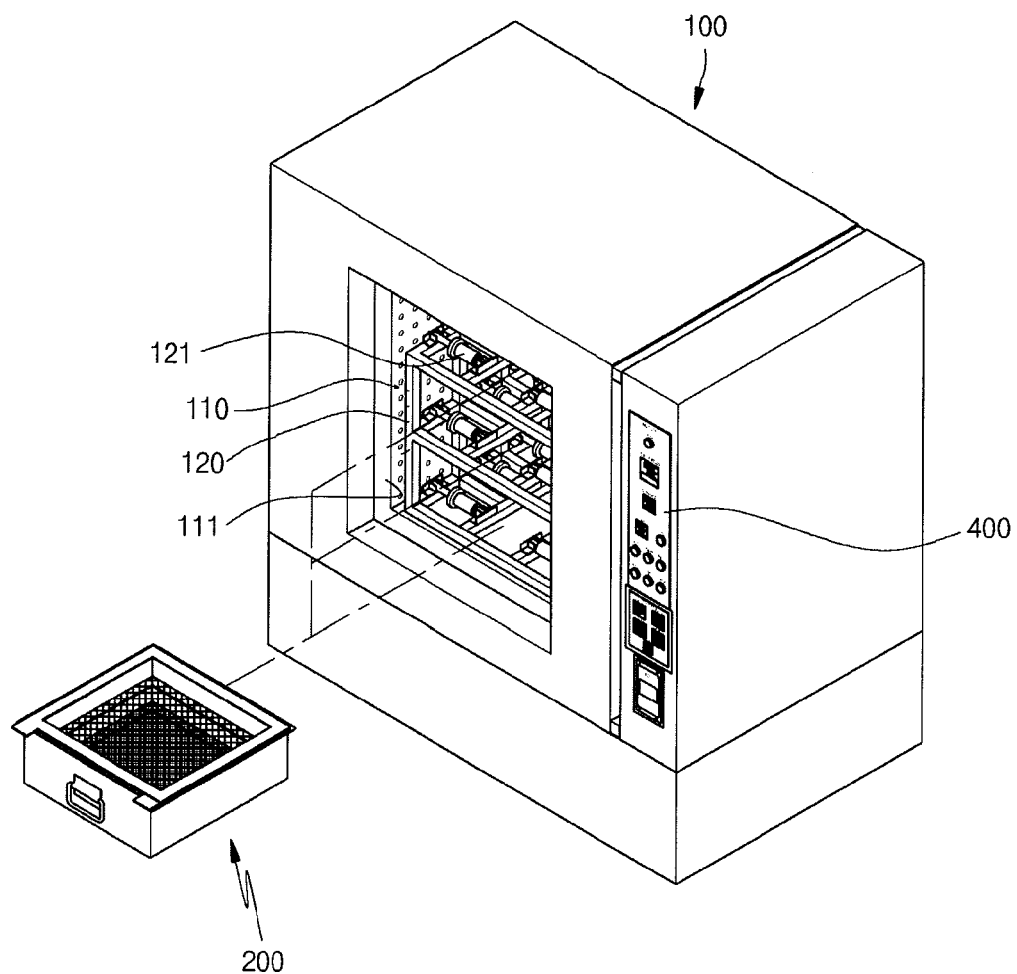
FIG. 1 is a perspective view showing an oxidation reactor and a scrap box for producing $U_3O_8$ powder according to the present invention.
Figure 2:
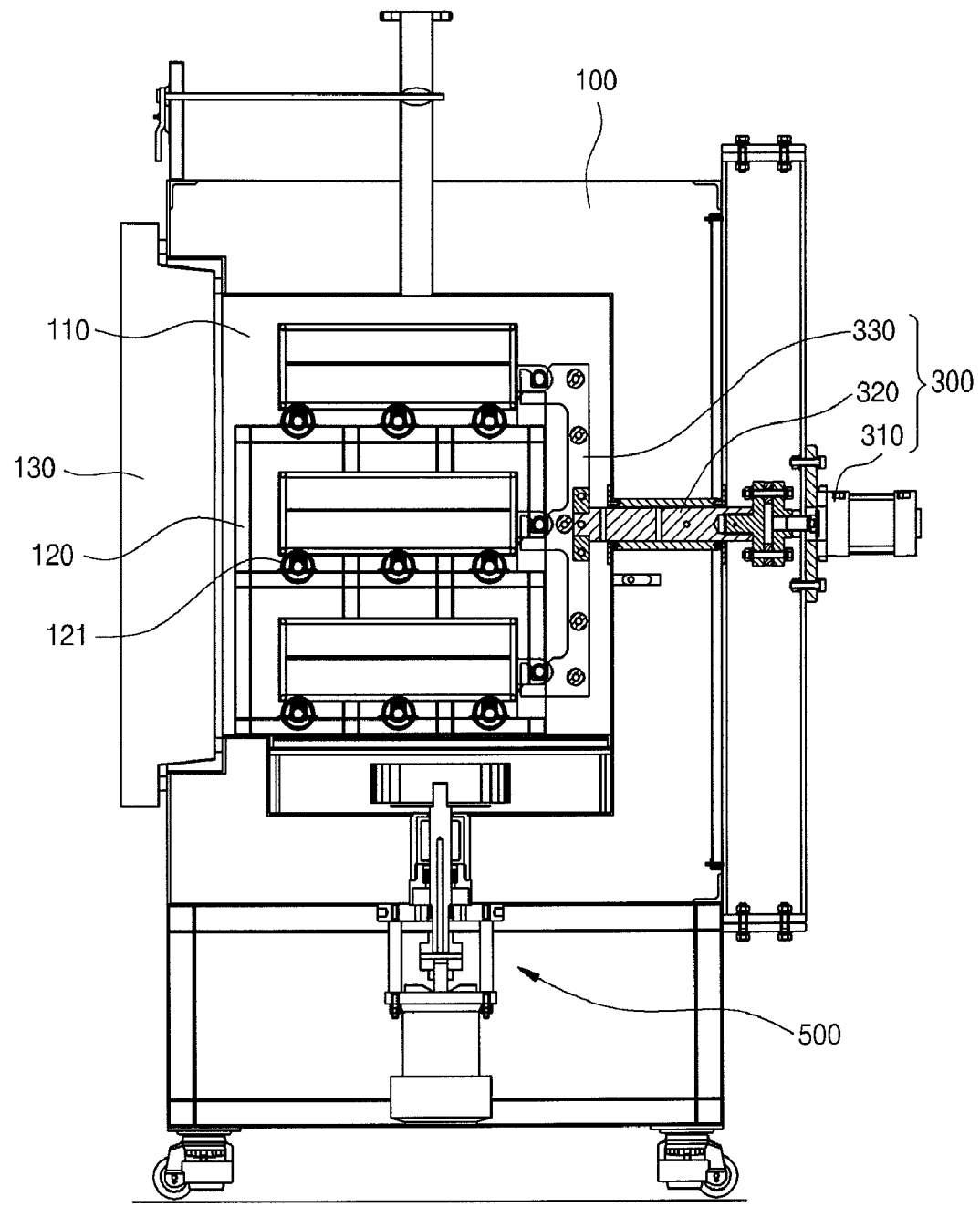
FIG. 2 is a side view showing an apparatus for producing $U_3O_8$ powder according to the present invention.

As shown in FIGS. 1 and 2, an apparatus for producing $U_3O_8$ powder according to the present invention largely includes an oxidation reactor 100, a scrap box 200, an impact generating unit 300 and a control unit 400.

The body of the oxidation reactor 100 has an approximately hexahedral shape, such that it can maintain its integrity when subjected to external pressure and resist deformation, and is made of a heat-resistant material which does not deform at high temperature.

The oxidation reactor 100 is provided with an interior space 110 which can contain a plurality of scrap boxes 200, and is provided at the front thereof with an inlet 111 such that the space 110 communicates with the inlet 111. A door 130 (shown in FIG. 2) is provided at the inlet 111, such that it can open and close, to enclose the interior space 110.

The space is provided with a multi-layer support frame 120 on which the scrap boxes 200 can be mounted, and each layer of the support frame 120 is provided with a rotatable guide roller 121 to facilitate the entry and withdrawal of the scrap box 200 into and out of reactor 100. The support frame 120 can be configured such that it is mounted by only one scrap box 200. Further, the guide roller 121 also serves to guide the scrap box 200, such that the scrap box 200 can be easily moved back and forth by the vibrations generated by the impact generating unit 300.

For instance, since a conventional oxidation reactor is not provided with rollers, scrap boxes containing defective $UO_2$ sintered pellets must be loaded into and out of the oxidation reactor by a forklift, which adds potential danger to the job. However, since the oxidation reactor 100 of the present invention is provided with the guide rollers 121, when the scrap box 200 is lifted up to the front of the oxidation reactor 100 by a forklift, and then a worker pushes the scrap box 200 toward the rear of the oxidation reactor 100, the scrap box 200 easily moves into space 110 of the oxidation reactor 100, and can be easily removed. Thus, the scrap box 200 can be easily mounted in the oxidation reactor 100, thereby reducing the danger inherent in performing such work.

Figure 3:
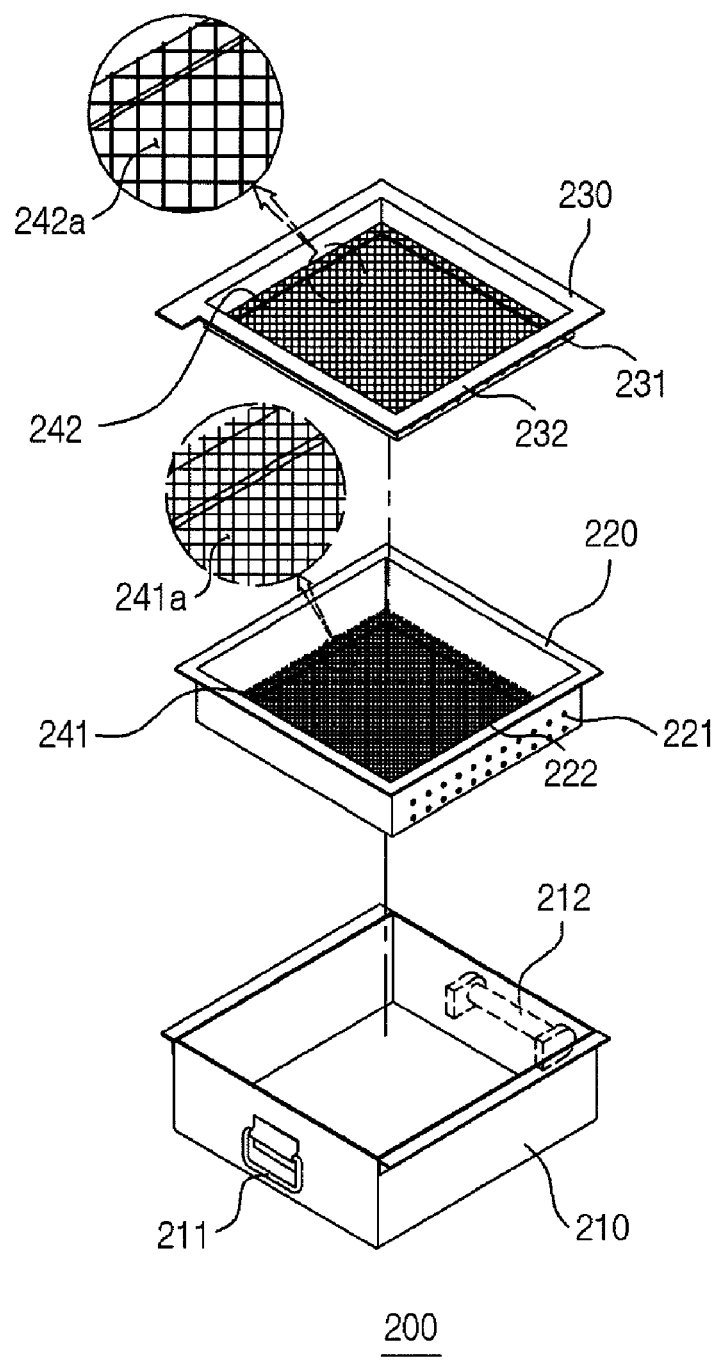
FIG. 3 is an exploded perspective view of a scrap box used in the apparatus for producing $U_3O_8$ powder according to the present invention.
Figure 4:
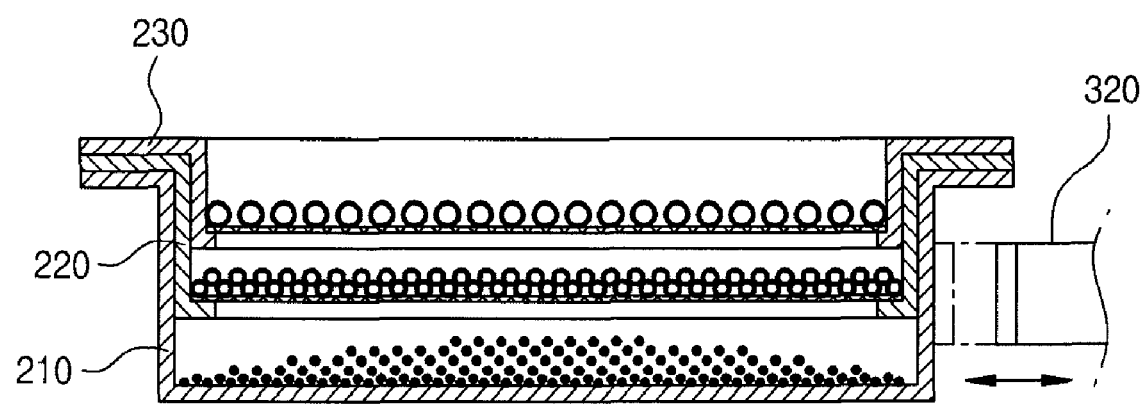
FIG. 4 is an explanatory sectional view of a scrap box used in the apparatus for producing $U_3O_8$ powder according to the present invention.

The scrap box 200, which is introduced into space 110 loaded with $UO_2$ sintered pellets or $UO_2$ slugs, is configured such that sieves 220 and 230 are sequentially fitted in a box body 210, as shown in FIG. 3. The box body 210 can be fitted with at least one sieve. The scrap box is made of stainless steel in order to prevent oxidation of the powder.

The box body 210 is configured such that its top portion is open, and is provided at the front with a knob 211 which can be gripped by a worker, and at the rear with a rack 212 which can be connected to a link 330 of the impact generating unit 300.

The box body 210 can be fitted with at least one sieve, and preferably with a plurality of sieves 220 and 230. The sieves 220 and 230 include meshes 241 and 242 having lattice-shaped holes 241a and 242a, respectively. In this case, since the lattice-shaped hole 241a of the lower sieve 220 is smaller than the lattice-shaped hole 242a of the upper sieve 230, $U_3O_3$ powder produced by the oxidation of defective $UO_2$ sintered pellets or $UO_2$ slugs is sequentially filtered and then falls down through holes 241a and 242a. In the above-configured box body 210, the oxidation rate of defective $UO_2$ sintered pellets or $UO_2$ slugs can be adjusted by changing the size of the lattice-shaped holes 241a and 242a, and the heat generated by the oxidation of defective $UO_2$ sintered pellets or $UO_2$ slugs changes in relation to the amount of defective $UO_2$ sintered pellets or $UO_2$ slugs that are loaded on each of the sieves 220 and 230, thus controlling the specific surface area of $U_3O_8$ powder which is an oxidation product.

In an embodiment of the present invention, the box body 210 is provided with a two-stage sieve unit of first and second sieves 220 and 230. The first and second sieves 220 and 230 are respectively provided at the edges thereof with protruding flanges 222 and 232, such that they are fixedly fitted in the box body 210. The first and second sieves 220 and 230 include respective meshes 241 and 242 having respective lattice-shaped holes 241a and 242a which are different from each other in size. That is, since the scrap box 200 of the present invention is configured such that the lattice-shaped hole 241a of the first (lower) sieve 220 is smaller than the lattice-shaped hole 242a of the second (higher) sieve 230, $U_3O_8$ powder produced by the oxidation of the $UO_2$ sintered pellets loaded on the second sieve 230 passes through the first sieve 220, and then piles up in the bottom of the box body 210. In this embodiment, the size of the lattice-shaped hole 241a of the mesh 241 of the first sieve 220 is about 3 mm, and the size of the lattice-shaped hole 242a of the mesh 242 of the second sieve 230 is about 5 mm. Therefore, $U_3O_8$ powder produced by the oxidation of $UO_2$ sintered pellets passes through the lattice-shaped hole 242a (about 5 mm) of the second sieve 230, and then passes through the lattice-shaped hole 241a (about 3 mm) of the first sieve 220, and finally piles up in the bottom of the box body 210. Since the $U_3O_8$ powder piled up in the bottom of the box body 210 is completely oxidized, heat is not generated by the oxidation of this $U_3O_8$ powder. Further, heat generated by the oxidation of $UO_2$ sintered pellets can be discharged to the outside through air holes 221 and 231 which are provided at lateral sides of the first and second sieves 220 and 230, respectively.

The impact generating unit 300 is provided at the rear of the oxidation reactor 100, and is operated at time intervals set by the control unit 400 (shown in FIG. 1). The impact generating unit 300 serves to uniformly dissipate heat generated by the oxidation of $UO_2$ sintered pellets in the scrap box 200 by applying an impact to the scrap box 200.

In this embodiment, the impact generating unit 300 includes a slide cylinder 310, and the slide cylinder 310 is configured such that an impact is transferred to the scrap box 200 by a plunger 320. The front end of the plunger 320 is connected to a link 330 such that all of the scrap boxes 200 mounted in the space 110 are impacted by one slide cylinder 310, because link 330 has an integrated ladder shape with hooks, and each hook of the link 330 is connected to the rack 212 of each of the scrap boxes 200, thus allowing the slide cylinder 310 to apply an impact to all of the scrap boxes 200. The scrap box 200 impacted by the slide cylinder 310 moves back and forth in the space 110, and thus the $U_3O_8$ powder obtained by the oxidation of $UO_2$ sintered pellets naturally falls downward. In this embodiment, the link 330 is automatically operated according to orders issued by the program of control unit 400, such that about 45 kg of $UO_2$ sintered pellets can be oxidized at one time.

Therefore, if the slide cylinder 310 is operated when $UO_2$ sintered pellets begin to oxidize, the scrap box 200 in the oxidation reactor 100 is impacted, so that the heat generated by the oxidation of $UO_2$ sintered pellets is maximally dissipated by the first and second sieves 220 and 230 mounted in the scrap box 200. As a result, it is possible to prevent the oxidation temperature from increasing from 300° C. to 400° C. or more, thereby increasing the specific surface area of $U_3O_8$ powder which is an oxidation product of $UO_2$ sintered pellets. In this case, the temperature around the $UO_2$ sintered pellets can be controlled to 400° C. or more by the vibration period of the scrap box 200. Meanwhile, since $U_3O_8$ powder which has dropped into the bottom of the box body 210 is mostly oxidized, heat is not generated by the oxidation of the $U_3O_8$ powder, so that this $U_3O_8$ powder does not influence other powder adjacent to it, with the result that the specific surface area of oxidized powder does not decrease.

Further, the scrap box 200 is configured such that the sizes of the respective lattice-shaped holes of the first and second sieves 220 and 230 are adjusted to allow $U_3O_8$ powder having the desired specific surface area to drop to the bottom of the box body 210, thus controlling the specific surface area of $U_3O_8$ powder which is an oxidation product.

The control unit 400, which serves to control the entire oxidation process of this embodiment, can include two sets of timers and a set of counters. The timer can function to indicate the time when the slide cylinder 310 starts to operate and adjust the interval of its operation, and the counter can function to confirm the number of operations of the slide cylinder 310.

Meanwhile, the apparatus for producing $U_3O_8$ powder according to the present invention can further include a magnetic sensor and a heating unit in addition to the above constituents.

The magnetic sensor can serve to detect whether or not the slide cylinder 310 is in operation. The slide cylinder 310 does not operate when it is malfunctioning. The heating unit can be a sheathed pipe type heater, and can be configured such that hot wires are easily replaced when they are damaged. Further, a circulating fan 500 (shown in FIG. 2) for uniformly circulating the heat necessary for oxidation to occur in the space 110 can be provided in the bottom of reactor 100.

The specific surface area of the $U_3O_8$ powder produced by the conventional apparatus is about 0.50 $m^2/g$ to 0.80 $m^2/g$, whereas the apparatus for producing $U_3O_8$ powder according to the present invention, which can be an automatic apparatus, can produce $U_3O_8$ powder having a large specific surface area of about 1.00 $m^2/g$ to 1.50 $m^2/g$ by dissipating the heat generated during a procedure of producing $U_3O_8$ powder.

Further, according to the apparatus for producing $U_3O_8$ powder of the present invention, the quality of $UO_2$ sintered pellets prepared using $U_3O_8$ powder can be improved by additionally using the $U_3O_8$ powder having a large specific surface area.

In the conventional apparatus for producing $U_3O_8$ powder, $UO_2$ sintered pellets or $UO_2$ slugs are oxidized only by heat without external force. Therefore, it is impossible to dissipate the heat generated by the oxidation of $UO_2$ sintered pellets or $UO_2$ slugs with conventional apparatus, thereby decreasing the specific surface area of $U_3O_8$ powder. However, according to the apparatus for producing $U_3O_8$ powder of the present invention, it is possible to prevent the specific surface area of $U_3O_8$ powder from being decreased by uniformly dissipating the heat generated by the oxidation of $UO_2$ sintered pellets or $UO_2$ slugs using the slide cylinder.

Further, according to the apparatus for producing $U_3O_8$ powder of the present invention, various operational conditions and adjunctive appliances can be directly controlled by operators, so that the convenience for users can be improved, thereby optimizing the process of producing $U_3O_8$ powder.

As described above, according to the apparatus for producing $U_3O_8$ powder of the present invention, in the process of oxidizing $UO_2$ sintered pellets loaded in scrap boxes provided in the interior space of an oxidation reactor, the scrap boxes are vibrated by an impact generating unit so that the heat generated by the oxidation of $UO_2$ sintered pellets is uniformly dissipated, with the result that it is possible to prevent the temperature around the $UO_2$ sintered pellets from unnecessarily increasing, thereby producing $U_3O_8$ powder having a larger specific surface area than that of $U_3O_8$ powder produced by the conventional apparatus.

Further, according to the apparatus for producing $U_3O_8$ powder of the present invention, since 2 wt % to 20 wt % of $U_3O_8$ powder having a large specific surface area is additionally used to prepare $UO_2$ sintered pellets, the grain size of the prepared $UO_2$ sintered pellets increases, and the porous structure of such a pellet is stabilized, thus remarkably improving its quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for producing $U_3O_8$ powder, the apparatus comprising:
   an oxidation reactor including a space formed therein;
   at least one scrap box configured to load $UO_2$ sintered pellets to be oxidized, the scrap box being located in the oxidation reactor; and
   a control unit configured to control an oxidation process.

2. The apparatus for producing $U_3O_8$ powder according to claim 1, further comprising a support frame configured to stack the at least one scrap box and located in the space.

3. The apparatus for producing $U_3O_8$ powder according to claim 2, wherein the support frame comprises at least one rotatable guide roller configured to guide the at least one scrap box into and out of the oxidation reactor.

4. The apparatus for producing $U_3O_8$ powder according to claim 1, wherein the at least one scrap box comprises a box body and one or more sieves fitted in the box body.

5. The apparatus for producing $U_3O_8$ powder according to claim 4, wherein each of the one or more sieves includes a mesh having holes, the holes of the mesh of a lower one of the one or more sieves being smaller than the holes of the mesh of an upper one of the one or more sieves.

6. The apparatus for producing $U_3O_8$ powder according to claim 1, further comprising an impact generating unit configured to apply an impact to the at least one scrap box to dissipate heat generated by oxidation of the $UO_2$ sintered pellets in the oxidation reactor.

7. The apparatus for producing $U_3O_8$ powder according to claim 6, wherein the impact generating unit includes a slide cylinder connected to each of the at least one scrap box to apply the impact thereto.

8. The apparatus for producing $U_3O_8$ powder according to claim 7, wherein the slide cylinder comprises a link connected to each of the at least one scrap box.

9. The apparatus for producing $U_3O_8$ powder according to claim 2, wherein the scrap box comprises a box body and one or more sieves fitted in the box body.

10. The apparatus for producing $U_3O_8$ powder according to claim 3, wherein the scrap box comprises a box body and one or more sieves fitted in the box body.

11. The apparatus for producing $U_3O_8$ powder according to claim 1, further comprising a circulating fan configured to circulate heat for oxidation.

12. The apparatus for producing $U_3O_8$ powder according to claim 6, further comprising a circulating fan configured to circulate heat for oxidation.

13. An apparatus for producing $U_3O_8$ powder, the apparatus comprising:

an oxidation reactor including a space formed therein;
a scrap box configured to load $UO_2$ sintered pellets to be oxidized, the scrap box being loaded in the oxidation reactor;
a support frame configured to stack the scrap box;
an impact generating unit configured to apply impact to the scrap box to dissipate heat generated by oxidation of the $UO_2$ sintered pellets in the oxidation reactor; and
a control unit configured to control an oxidation process;
wherein the support frame has four or six rotatable guide rollers configured to guide the scrap box into and out of the oxidation reactor;
wherein the scrap box comprises a box body and two sieves fitted in the box body;
wherein each of the sieves includes a mesh having holes, the holes of the mesh of a lower one of the sieves being smaller than the holes of the mesh of an upper one of the sieves;
wherein the impact generating unit includes a slide cylinder connected to each of the scrap box to apply the impact thereto; and
wherein the slide cylinder has a link connected to the scrap box.

* * * * *